(12) United States Patent
Fukui et al.

(10) Patent No.: US 9,387,621 B2
(45) Date of Patent: Jul. 12, 2016

(54) CONVEYANCE RECEIVER FOR HONEYCOMB FORMED BODY

(71) Applicant: NGK Insulators, Ltd., Nagoya (JP)

(72) Inventors: Toshihiro Fukui, Nagoya (JP); Daiki Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/627,343

(22) Filed: Feb. 20, 2015

(65) Prior Publication Data

US 2015/0258725 A1 Sep. 17, 2015

(30) Foreign Application Priority Data

Mar. 11, 2014 (JP) ................................. 2014-047233

(51) Int. Cl.
| | |
|---|---|
| B65G 15/40 | (2006.01) |
| B28B 13/04 | (2006.01) |
| B29C 47/34 | (2006.01) |
| B65G 49/08 | (2006.01) |
| B65G 17/36 | (2006.01) |
| B29C 47/00 | (2006.01) |

(Continued)

(52) U.S. Cl.
CPC ............... *B29C 47/34* (2013.01); *B28B 13/04* (2013.01); *B29C 47/0028* (2013.01); *B29C 47/0066* (2013.01); *B29C 47/0842* (2013.01); *B65G 17/36* (2013.01); *B65G 49/08* (2013.01); *B28B 3/20* (2013.01)

(58) Field of Classification Search
CPC ...................................................... B28B 13/04
USPC ........... 198/803.14, 803.15, 850–853, 867.11
See application file for complete search history.

(56) References Cited

U.S. PATENT DOCUMENTS

| | | | | |
|---|---|---|---|---|
| 2,888,127 | A * | 5/1959 | Uhlig ..................... | B65G 17/32 101/40.1 |
| 4,787,505 | A * | 11/1988 | Tweedy .................. | B65G 17/32 198/803.11 |
| 4,829,634 | A * | 5/1989 | Keith .................... | B26D 7/0625 198/803.14 |

(Continued)

FOREIGN PATENT DOCUMENTS

| | | |
|---|---|---|
| CN | 1880048 A | 12/2006 |
| EP | 2 121 487 B1 | 8/2012 |

(Continued)

OTHER PUBLICATIONS

European Search Report, European Application No. 15157947.1, dated Oct. 15, 2015 (7 pages).

*Primary Examiner* — Douglas Hess
(74) *Attorney, Agent, or Firm* — Burr & Brown, PLLC

(57) ABSTRACT

A conveyance receiver for a honeycomb formed body is a conveyance receiver where a pillar, clayey honeycomb formed body extruded from a die is placed with its central axis set horizontally and moves on a conveyance path to convey the honeycomb formed body to a next process, and the conveyance receiver includes a concaved surface concaved to both end faces parallel to a surface perpendicular to the central axis of the honeycomb formed body to be placed, and that is a surface in contact with a side surface of the honeycomb formed body to be conveyed; and a receiver main body constituted of a plurality of members, and coupling means that couples the members to one another, and the receiver main body at least has a first member at the one end face side and a second member at the other end face side as the members.

12 Claims, 7 Drawing Sheets

(51) Int. Cl.
  *B29C 47/08* (2006.01)
  *B28B 3/20* (2006.01)

(56) References Cited

U.S. PATENT DOCUMENTS

| | | | | |
|---|---|---|---|---|
| 5,054,258 A * | 10/1991 | Tait | ............ | A61J 3/072 |
| | | | | 198/803.14 |
| 5,429,226 A * | 7/1995 | Ensch | ............ | B65G 17/44 |
| | | | | 198/803.14 |
| 5,441,146 A * | 8/1995 | Ziegler | ............ | B65B 59/005 |
| | | | | 198/347.2 |
| 5,799,779 A * | 9/1998 | Konitzer | ............ | B65G 17/32 |
| | | | | 198/803.15 |
| 6,079,543 A | 6/2000 | Palmaer | | |
| 6,112,886 A * | 9/2000 | Horn | ............ | B65G 17/002 |
| | | | | 198/803.14 |
| 6,209,716 B1 * | 4/2001 | Bogle | ............ | B65G 17/086 |
| | | | | 198/834 |
| 6,230,955 B1 * | 5/2001 | Parks | ............ | B65G 37/005 |
| | | | | 166/77.3 |
| 6,314,876 B1 * | 11/2001 | Ackley | ............ | B41F 17/36 |
| | | | | 101/44 |
| 6,405,852 B1 * | 6/2002 | Christ | ............ | B65B 43/52 |
| | | | | 198/474.1 |
| 6,439,376 B1 * | 8/2002 | Spatafora | ............ | B65B 19/02 |
| | | | | 198/469.1 |
| 8,245,839 B2 * | 8/2012 | Tajima | ............ | B28B 13/04 |
| | | | | 198/803.14 |
| D672,003 S * | 12/2012 | Botes | ............ | D22/108 |
| 8,356,710 B2 * | 1/2013 | Roy | ............ | B65G 17/063 |
| | | | | 198/803.14 |
| 8,794,427 B2 * | 8/2014 | Lofaro | ............ | H01L 21/68785 |
| | | | | 198/346.1 |
| 2002/0046925 A1 | 4/2002 | Miyakawa et al. | | |
| 2004/0076705 A1 | 4/2004 | Ishikawa et al. | | |
| 2007/0194480 A1 | 8/2007 | Ishikawa et al. | | |
| 2008/0202896 A1 | 8/2008 | MacLachlan | | |

FOREIGN PATENT DOCUMENTS

| | | |
|---|---|---|
| JP | 2002-046856 A1 | 2/2002 |
| JP | 2002-103325 A1 | 4/2002 |
| JP | 2004-142160 A1 | 5/2004 |
| JP | 2009-202537 A | 9/2009 |
| WO | 2008/103585 A2 | 8/2008 |

\* cited by examiner

CONVEYANCE RECEIVER FOR HONEYCOMB FORMED BODY

The present application is an application based on JP 2014-047233 filed on Mar. 11, 2014 with Japan Patent Office, the entire contents of which are incorporated herein by reference.

BACKGROUND OF THE INVENTION

Field of the Invention

The present invention relates to a conveyance receiver for a honeycomb formed body. More specifically, the present invention is applicable as a conveyance receiver for honeycomb formed bodies having various lengths and a storage space of the conveyance receivers for a honeycomb formed body may be saved.

Conventionally, as one example of a method for forming a honeycomb formed body, an extrusion forming method has been known. According to this method, a die with a desired shape is installed at an extrusion outlet of an extruder where an extrusion direction is set in a horizontal direction, and a ceramic material introduced into the extruder is continuously extruded from the die to form a pillar honeycomb formed body. The extruded pillar honeycomb formed body is placed on a conveyance receiver and is carried over a conveyance path, and after subsequent processes (respective processes of cutting, drying, firing, and the like), a honeycomb structure is formed as a final form.

As such conveyance receiver for a honeycomb formed body, there has been known a conveyance receiver that has a supporting member made of foamed polystyrene on an aluminum base and is covered with a buffer material (see Patent Document 1). As the conveyance receiver for a honeycomb formed body, for example, there has been also known a receiver that uses a foam (see Patent Document 2) or a low repulsion material (see Patent Document 3) at a portion in contact with a honeycomb formed body.

[Patent Document 1] JP-A-2002-046856
[Patent Document 2] JP-A-2002-103325
[Patent Document 3] JP-A-2004-142160

SUMMARY OF THE INVENTION

When changing a size of the honeycomb formed body (length of the honeycomb formed body in a cell extending direction and a diameter of the honeycomb formed body) to be conveyed, the conveyance receivers disclosed in Patent Documents 1 to 3 need to be changed according to the size of the honeycomb formed body. Therefore, a plurality of conveyance receivers (conveyance receivers for a plurality of sizes) need to be prepared according to kinds of the honeycomb formed bodies. Additionally, a large space for storing the conveyance receivers for a plurality of sizes needs to be secured.

The present invention has been developed in view of the above-mentioned problems, and an object of the present invention is to provide a conveyance receiver for a honeycomb formed body applicable for various lengths and to save storage space for the conveyance receiver for a honeycomb formed body.

To solve the above-mentioned problems, according to the present invention, the following conveyance receiver for a honeycomb formed body is provided.

According to a first aspect of the present invention, a conveyance receiver is provided for a honeycomb formed body where a pillar, clayey honeycomb formed body extruded from a die is placed with its central axis set horizontally and moves on a conveyance path to convey the honeycomb formed body to a next process, and the conveyance receiver for a honeycomb formed body includes a concaved surface concaved at both end faces parallel to a surface perpendicular to the central axis of the honeycomb formed body to be placed, and that is a surface in contact with a side surface of the honeycomb formed body to be conveyed; and a receiver main body constituted of a plurality of members, and coupling means that couples the plurality of members constituting the receiver main body to one another, and the receiver main body at least has a first member at the one end face side and a second member at the other end face side as the plurality of members.

According to a second aspect of the present invention, the conveyance receiver for a honeycomb formed body according to the first aspect is as follows. The coupling means couples the plurality of members constituting the receiver main body to one another by screwing or fitting.

According to a third aspect of the present invention, the conveyance receiver for a honeycomb formed body according to the second aspect is as follows. The coupling means has a coupling hole portion that is open to the end face on the second member side of the receiver main body and extends to the first member, a bolt member inserted into the coupling hole portion, and a nut member screwed with the bolt member.

According to a fourth aspect of the present invention, the conveyance receiver for a honeycomb formed body according to any one of the first through third aspects is as follows. The receiver main body is made of foamed polyurethane resin.

According to a fifth aspect of the present invention, the conveyance receiver for a honeycomb formed body according to any one of the first through fourth aspects is as follows. A shape of the concaved surface at the end face is an arc, and a curvature radius of the concaved surface at the end face is 80mm or more.

The conveyance receiver for a honeycomb formed body of the present invention is applicable as a conveyance receiver for a honeycomb formed bodies having various lengths and a storage space for the conveyance receiver for a honeycomb formed body is saved.

DETAILED DESCRIPTION OF THE INVENTION

Next, a mode for carrying out the present invention will be described in detail with reference to the drawings. It should be understood that the present invention is not limited to the following embodiments and that design change, improvement, or the like may be suitably added on the basis of ordinary knowledge of a person skilled in the art without departing from the gist of the present invention.

Figure 1:
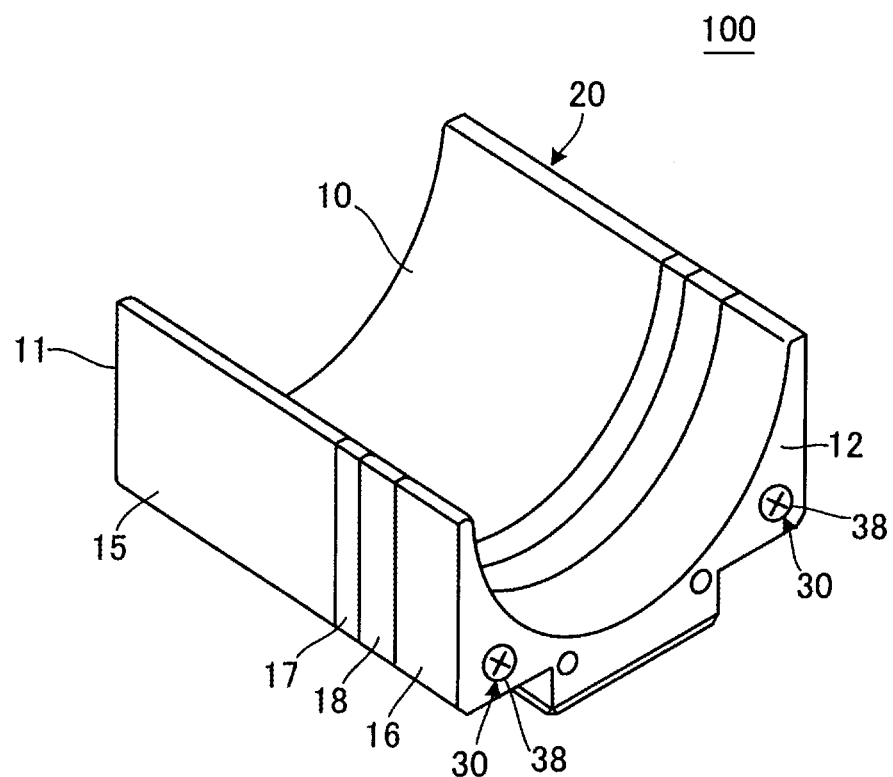
FIG. 1 is a perspective view schematically showing a conveyance receiver for a honeycomb formed body of one embodiment of the present invention.
Figure 2:
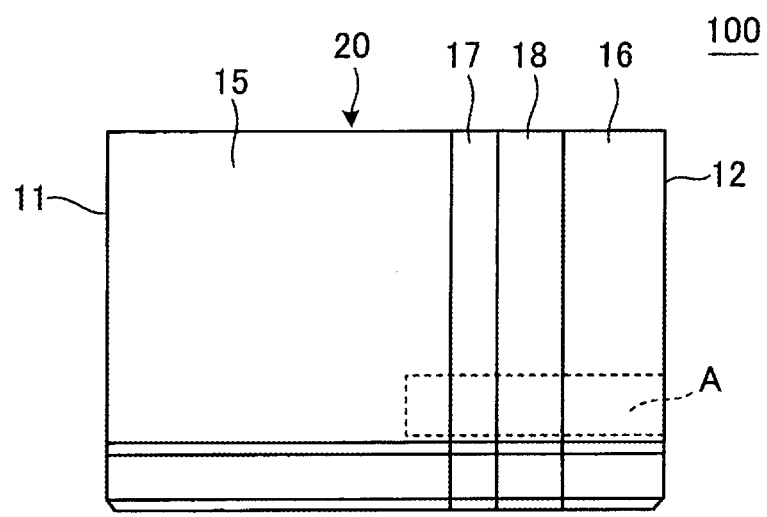
FIG. 2 is a side view schematically showing the conveyance receiver for a honeycomb formed body of one embodiment of the present invention.

(1) Conveyance Receiver for Honeycomb Formed Body:

One embodiment of the h conveyance receiver for a honeycomb formed body of the present invention is a conveyance receiver for a honeycomb formed body 100 shown in FIG. 1 and FIG. 2. A pillar, clayey honeycomb formed body 1 extruded from a die is placed with its central axis set horizontally on this conveyance receiver 100 (see FIG. 9 and FIG. 10). The conveyance receiver 100 moves on a conveyance path to convey the honeycomb formed body 1 to the next process. The conveyance receiver 100 has a concaved surface 10 concaved at both end faces 11 and 12 parallel to a surface perpendicular to a central axis of the honeycomb formed body 1 to be placed thereon, and is a surface in contact with a side surface 3 of the honeycomb formed body 1 to be conveyed. Further, the conveyance receiver 100 has a receiver main body 20, which is constituted of a plurality of members, and coupling means 30, which couples the plurality of members to one another constituting this receiver main body 20. The receiver main body 20 at least has a first member 15 at the one end face 11 side, and a second member 16 at the other end face 12 side, as the plurality of members.

Such conveyance receiver 100 has the receiver main body 20 constituted of the plurality of members. Accordingly, the conveyance receiver 100 is applicable as a conveyance receiver for a honeycomb formed bodies having various lengths. That is, even if the conveyance receiver 100 is used for fabricating honeycomb formed bodies having different lengths (namely, lengths in a cell extending direction), by appropriately combining the plurality of members, which constitute the receiver main body, the conveyance receiver 100 can be adjusted to be an appropriate length according to the length of the honeycomb formed body. Since the conveyance receiver 100 is used by appropriately combining the plurality of members, it is only necessary to retain the members required for the combination. Since this eliminates the need for securing a large space (storage space) for storing the whole conveyance receiver as conventionally done, the storage space may be saved.

Figure 9:
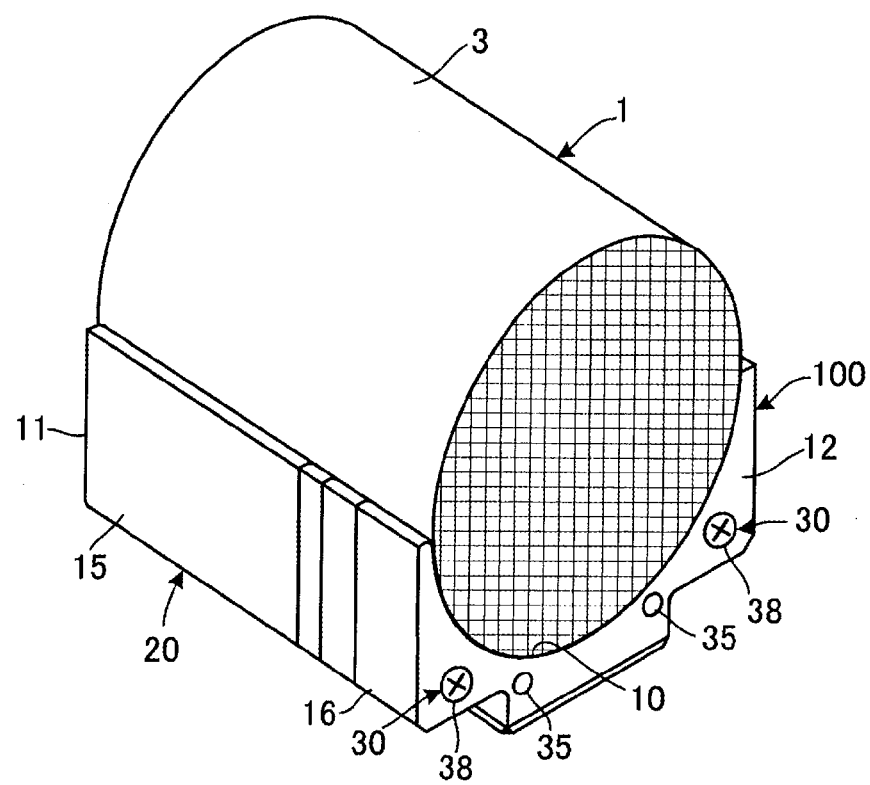
FIG. 9 is a perspective view schematically showing a state where a honeycomb formed body is placed on the conveyance receiver shown in FIG. 1.
Figure 10:
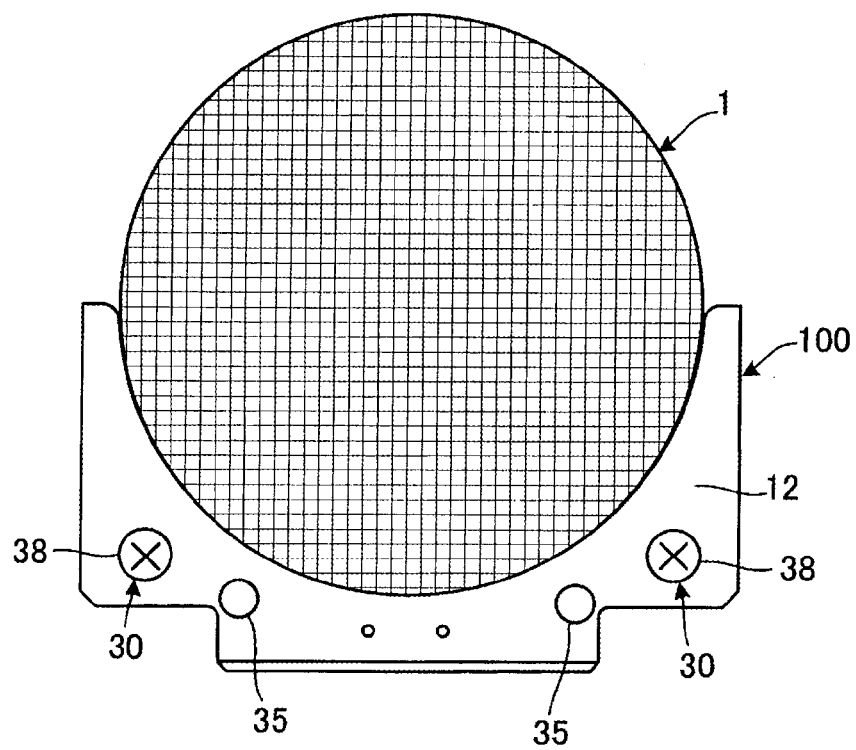
FIG. 10 is a front view schematically showing a state where the honeycomb formed body is placed on the conveyance receiver shown in FIG. 1.

FIG. 9 and FIG. 10 show a state where the one honeycomb formed body 1 is placed on the one conveyance receiver 100. That is, these drawings show a state after the clayey honeycomb formed body extruded from the die has been cut off. Here, in an extrusion method of the honeycomb formed body, the conveyance receiver for a honeycomb formed body of the present invention is used as follows. First, from the die installed to an extruder, the pillar honeycomb formed body is consecutively extruded. The clayey honeycomb formed body, which has been extruded from the die, is sequentially passed to a plurality of conveyance receivers (for example, 30 pieces) disposed without intervals on a conveyance path. Afterwards, at a position between the adjacent conveyance receivers among the plurality of conveyance receivers, the clayey honeycomb formed body, which has been extruded from the die, is cut. FIG. 9 and FIG. 10 show this state. The cut honeycomb formed bodies are conveyed with the conveyance receivers for the next process.

FIG. 9 is a perspective view schematically showing a state where the honeycomb formed body is placed on the conveyance receiver shown in FIG. 1. FIG. 10 is a front view schematically showing a state where the honeycomb formed body is placed on the conveyance receiver shown in FIG. 1.

The conveyance receiver for a honeycomb formed body of the present invention is applicable to honeycomb formed bodies with various shapes. That is, since the conveyance receiver for a honeycomb formed body matching an outer circumference shape of the conveyed honeycomb formed body is employed, the shape of the conveyed honeycomb formed body is not especially limited; however, the conveyance receiver for a honeycomb formed body is suitable for a honeycomb formed body whose cross-sectional shape perpendicular to the central axis is a circular shape, an elliptical shape, or the like.

The conveyance receiver for a honeycomb formed body of the present invention is preferable for use as a receiver for conveying a large-sized clayey honeycomb formed body (honeycomb structure whose diameter is 144 mm or more) extruded from the die in a manufacturing process of the large-sized honeycomb structure. To manufacture the large-sized honeycomb structures, a process of grinding the outer peripheral portion thereof (cutting process) may be required. This is because even if minute unevenness occurs at the outer peripheral surface of the honeycomb formed body, the grinding process removes this unevenness as follows. That is, since the conveyance receiver for a honeycomb formed body of the present invention has the receiver main body constituted of the plurality of members, a minute unevenness may occur at the concaved surface where the honeycomb formed body is to be placed, and this unevenness may form the minute unevenness at the outer peripheral surface of the honeycomb formed body. When manufacturing a honeycomb structure (ordinary honeycomb structure) whose diameter is smaller than the large-sized honeycomb structure, the unevenness at the concaved surface can be prevented by coupling the respective members constituting the conveyance receiver with high accuracy.

When manufacturing the large-sized honeycomb structures, the conveyance receivers to be used also become large; therefore, compared with the case where the ordinary honeycomb structures are manufactured, the larger storage space for conveyance receiver needs to be provided. Therefore, the use of the conveyance receiver for a honeycomb formed body of the present invention as the conveyance receiver for the large-sized honeycomb structure allows effective saving of the storage space. That is, a reduction ratio of the storage space brought by employing the conveyance receiver for a honeycomb formed body of the present invention is the same between the case of manufacturing the large-sized honeycomb structures and the case of manufacturing the ordinary honeycomb structures. Meanwhile, a saved space in manufacturing the large-sized honeycomb structures is larger than a saved space in manufacturing the ordinary honeycomb structures.

As described above, the conveyance receiver for a honeycomb formed body of the present invention is preferably used for the manufacturing process of the large-sized honeycomb structures, and from this aspect, a curvature radius of the concaved surface at the end face of the conveyance receiver is preferable to be within the following range. That is, in the case where the shape of the concaved surface at the end face is an arc, a curvature radius of the concaved surface at the end face of the conveyance receiver is preferable to be 80 mm or more. This curvature radius is further preferable to be 80 to 160 mm.

(1-1) Receiver Main Body:

The receiver main body is preferably made of foamed polyurethane resin. With the receiver main body made of the foamed polyurethane resin, the weight of the conveyance receiver can be reduced.

A foaming rate of the foamed polyurethane resin is preferable to be 1 to 5 times and further preferable to be 2 to 3.5 times. When the foaming rate falls within the above range, a sufficient strength can be ensured while reducing the weight of the conveyance receiver.

With the plurality of members constituting the receiver main body, lengths (may be referred to as "thicknesses" of the members) in the direction from the one end face to the other end face of the conveyance receiver may be all the same or may be different one another. With the conveyance receiver for a honeycomb formed body of the present invention, the first member of the receiver main body can be designed as a main member. Members (including the second member) other than the first member can be designed as auxiliary members. For example, by appropriately combining the auxiliary members, the conveyance receiver for a honeycomb formed body of the present invention is further easily applicable as the conveyance receiver for the honeycomb formed bodies having various lengths.

The "main member" means the member whose length in the direction from the one end face to the other end face of the conveyance receiver is 145 mm or more. The "auxiliary member" means the member whose length in the direction from the one end face to the other end face of the conveyance receiver is less than 80 mm.

Figure 3:
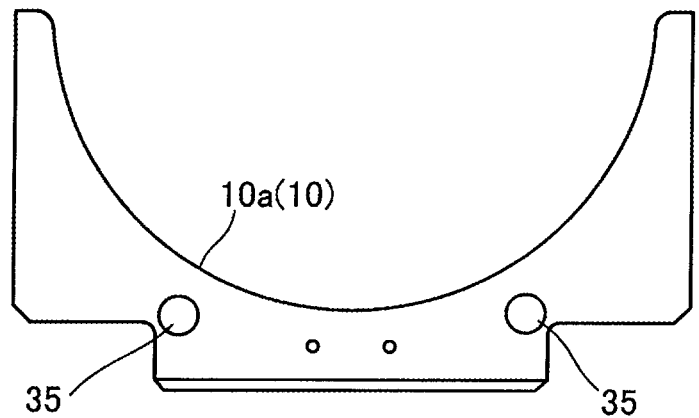
FIG. 3 is a plan view schematically showing a state where one member constituting a receiver main body of the conveyance receiver for a honeycomb formed body of one embodiment of the present invention is viewed from one end face side.
Figure 4:
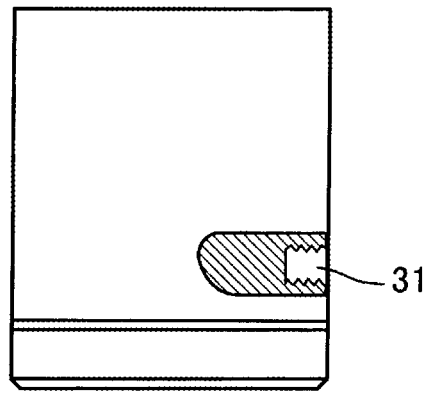
FIG. 4 is a side view schematically showing a state of viewing the member shown in FIG. 3 from a side surface and a partial cross section.
Figure 5:
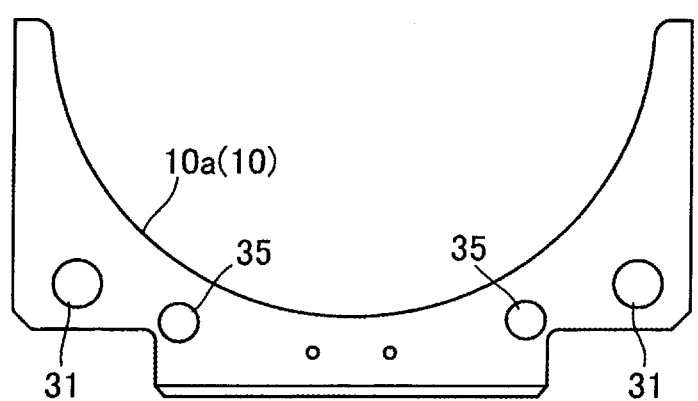
FIG. 5 is a plan view schematically showing a state of viewing the member shown in FIG. 3 from another end face side.

FIG. 3 to FIG. 5 show the first member 15 constituting the receiver main body 20 (see FIG. 1). As shown in FIG. 3 and FIG. 5, the first member 15 has a concaved surface 10a that constitutes the concaved surface 10 (see FIG. 1) of the conveyance receiver 100. As shown in FIG. 4 and FIG. 5, at a part of the first member 15, coupling hole portions 31 of the coupling means 30 (see FIG. 1) are formed. As shown in FIG. 3 and FIG. 5, at the first member 15, positioning plates 35, which are to identify a position (location) of the conveyance receiver 100 in the manufacturing process of the honeycomb formed body, are arranged.

FIG. 3 is a plan view schematically showing a state where one member (first member) constituting the receiver main body of the conveyance receiver for a honeycomb formed body of one embodiment of the present invention is viewed from the one end face 11 side. FIG. 4 is a side view schematically showing a state of viewing the member shown in FIG. 3 from a side surface and a partial cross section. FIG. 5 is a plan view schematically showing a state of viewing the member shown in FIG. 3 from the other end face 12 side.

Figure 6:
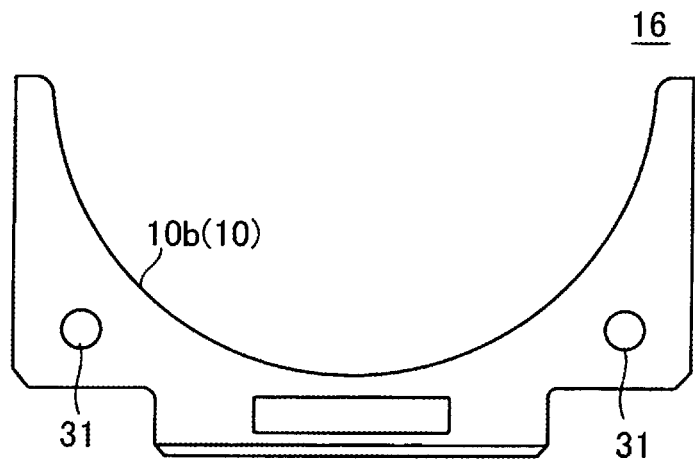
FIG. 6 is a plan view schematically showing a state where another one member constituting the receiver main body of the conveyance receiver for a honeycomb formed body of one embodiment of the present invention is viewed from the one end face side.
Figure 7:
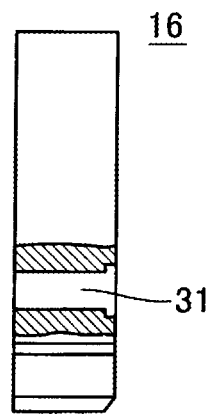
FIG. 7 is a side view schematically showing a state of viewing the member shown in FIG. 6 from a side surface and a partial cross section.
Figure 8:
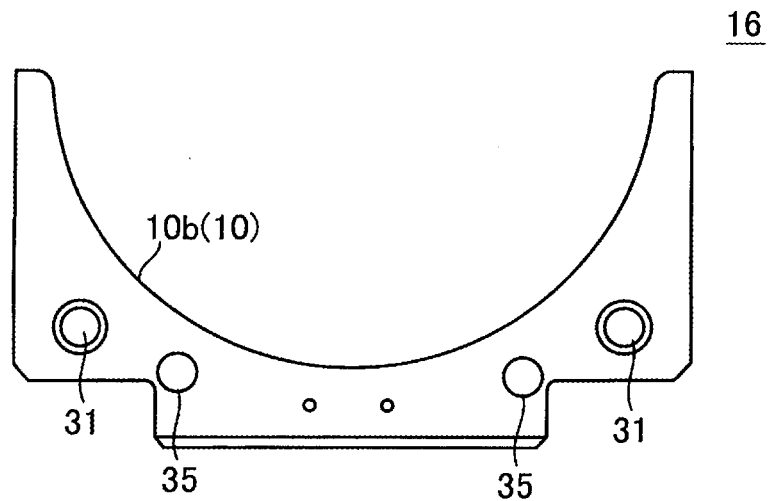
FIG. 8 is a plan view schematically showing a state of viewing the member shown in FIG. 6 from another end face side.

FIG. 6 to FIG. 8 show the second member 16 constituting the receiver main body 20 (see FIG. 1). As shown in FIG. 6 and FIG. 8, the second member 16 has a concaved surface 10b that constitutes the concaved surface 10 (see FIG. 1) of the conveyance receiver 100. As shown in FIG. 6 to FIG. 8, at the second member 16, coupling hole portions 31 of the coupling means 30 (see FIG. 1) are formed. As shown in FIG. 6 and FIG. 8, at the second member 16, the positioning plates 35, which are to identify a position of the conveyance receiver 100 during conveyance of the honeycomb formed body, are arranged.

FIG. 6 is a plan view schematically showing a state where another one member (second member) constituting the receiver main body of the conveyance receiver for a honeycomb formed body of one embodiment of the present invention is viewed from the one end face 11 side. FIG. 7 is a side view schematically showing a state of viewing the member shown in FIG. 6 from a side surface and a partial cross section. FIG. 8 is a plan view schematically showing a state of viewing the member shown in FIG. 6 from the other end face 12 side.

The conveyance receiver 100 has a third member 17 and a fourth member 18 as the plurality of members constituting the receiver main body 20 as shown in FIG. 1 and FIG. 2, in addition to the first member 15 and the second member 16. A thickness of the third member 17 is thinner than the second member, and a thickness of the fourth member 18 is thinner than the third member. The third member 17 and the fourth member 18 are the auxiliary members in the conveyance receiver 100.

The members constituting the receiver main body can be the thinnest up to 15 mm. If the thickness of the member constituting the receiver main body is too thin, this may lead to degrade of the strength of the member.

As long as the receiver main body is constituted of the plurality of members, the number of members is not especially limited. For example, the number of members is preferable to be one to four pieces. If the number of plurality of members constituting the receiver main body is too many, this may require additional work in assembly.

(1-2) Coupling Means:

The coupling means is preferable to couple the plurality of members constituting the receiver main body to one another by screwing or fitting. This constitution facilitates the assembly.

In the case where the coupling means couples the plurality of members constituting the receiver main body to one another by screwing, the coupling means can be specifically the following constitution. That is, the coupling means can include a coupling hole portion, which is open to the end face on the second member side of the receiver main body and extends to the first member, a bolt member, which is inserted into this coupling hole portion, and a nut member, which is screwed with this bolt member. The coupling means 30, which is shown in FIG. 11, and coupling means 430, which is shown in FIG. 16, are examples of specifically showing such coupling means.

Figure 11:
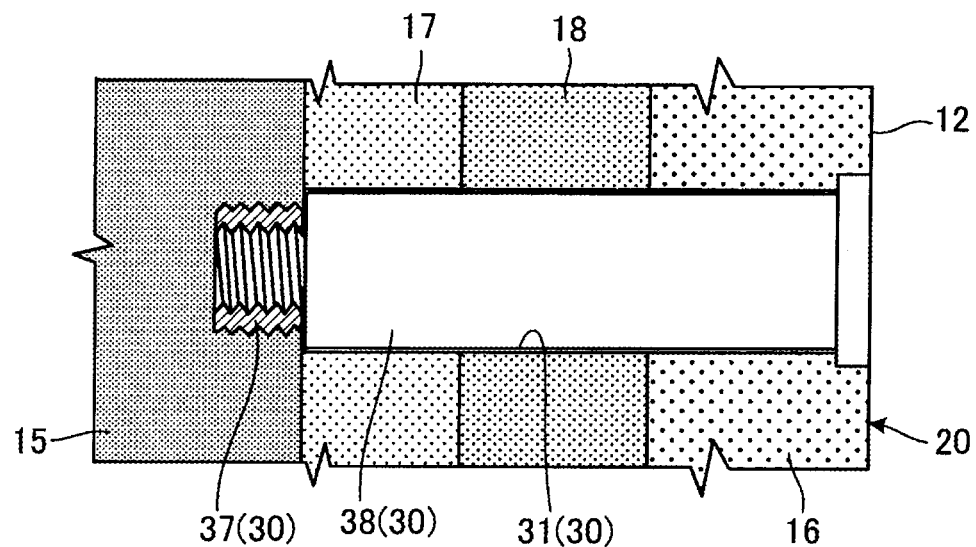
FIG. 11 is an explanatory view schematically showing enlarged coupling means of the conveyance receiver for a honeycomb formed body of one embodiment of the present invention.

The coupling means 30 shown in FIG. 11 includes a coupling hole portion 31, which is open to the end face 12 on the second member 16 side of the receiver main body 20 and extends to the first member 15, a bolt member 38, which is to be inserted into this coupling hole portion 31, and a nut member 37, which is screwed with a distal end portion of this bolt member 38. The nut member 37 has a tubular shape and forms thread ridges on both an inner surface and an outer surface. The bolt member 38 has a thread ridge that can be screwed with the nut member 37 at a distal end. FIG. 11 is an explanatory view schematically showing enlarged coupling means of the conveyance receiver for a honeycomb formed body of one embodiment of the present invention, and shows a cross section of a region A shown in FIG. 2 parallel to the paper (note that the bolt member 38 is not a cross section).

Figure 16:
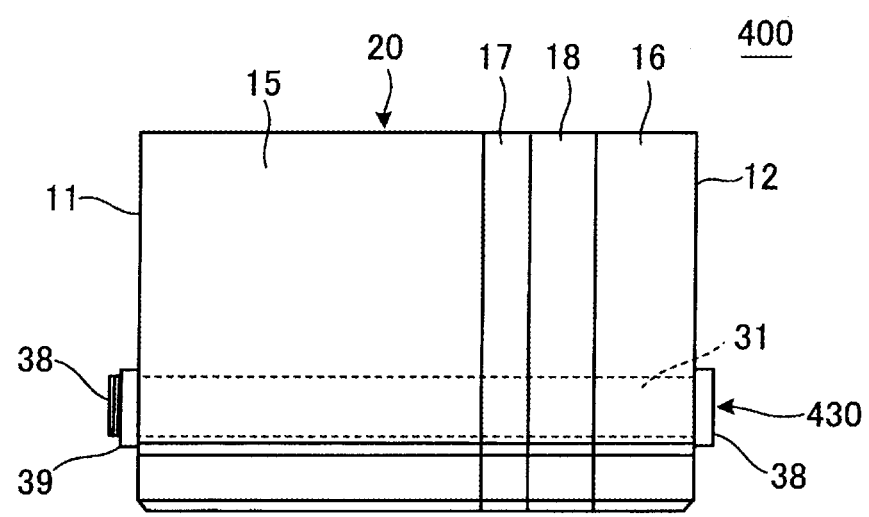
FIG. 16 is a side view schematically showing the conveyance receiver for a honeycomb formed body of yet another embodiment of the present invention.

The coupling means 430 of a conveyance receiver 400 shown in FIG. 16 has the coupling hole portion 31, which passes through from the one end face 11 to the other end face 12 of the receiver main body 20, the bolt member 38, and a nut member 39, which is screwed with this bolt member 38. The bolt member 38 is inserted into the coupling hole portion 31 and has a length equal to or more than the length from the one end face 11 to the other end face 12 of the receiver main body 20. The nut member 39 has a tubular shape and internally includes a thread ridge that can be screwed with the bolt member 38. Such coupling means 430 tightens the receiver main body 20 from both ends with the bolt member 38 and the nut member 39, thus securing the plurality of members 15, 16, 17, and 18, which constitute the receiver main body 20. FIG. 16 is a side view schematically showing the conveyance receiver for a honeycomb formed body of yet another embodiment of the present invention.

Figure 12:
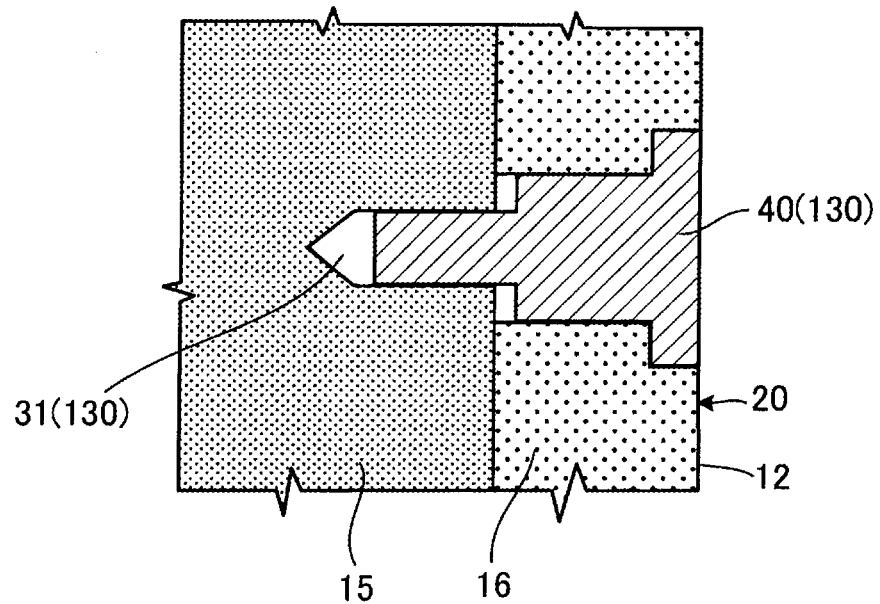
FIG. 12 is an explanatory view schematically showing enlarged coupling means of the conveyance receiver for a honeycomb formed body of another embodiment of the present invention.

As the coupling means for coupling the plurality of members, which constitute the receiver main body, to one another by fitting, the aspect as shown in FIG. 12 is applicable. Coupling means 130 shown in FIG. 12 has the coupling hole portion 31, which is open to the end face 12 on the second member 16 side of the receiver main body 20 and extends to the first member 15, and a skewer-shaped member (pin) 40, which is inserted into the coupling hole portion 31 so as to fit with this coupling hole portion 31. This constitution enhances positioning accuracy. FIG. 12 is an explanatory view schematically showing enlarged coupling means of the conveyance receiver for a honeycomb formed body of another embodiment of the present invention. FIG. 12 shows a cross section similar to FIG. 11.

Figure 13:
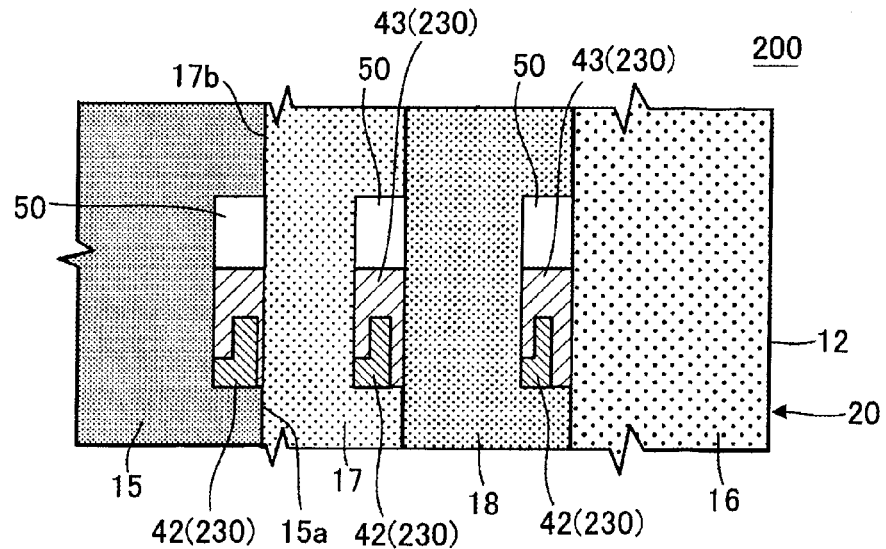
FIG. 13 is an explanatory view schematically showing enlarged coupling means of the conveyance receiver for a honeycomb formed body of yet another embodiment of the present invention.

As the coupling means, the aspect shown in FIG. 13 may be used. That is, the coupling means may be constituted of a hook-shaped portion, which is formed at each member constituting the receiver main body, and a hook receiving portion, which has a shape to engage the hook-shaped portion. The hook-shaped portion and the hook receiving portion may be mutually engaged to couple the respective members. Coupling means 230 shown in FIG. 13 has a hook-shaped portion 42, which is formed on an end face 15a side of the first member 15 constituting the receiver main body 20, and a hook receiving portion 43, which is formed on an end face 17b side of the third member 17 and has a shape to engage the hook-shaped portions 42 of the first member 15. The hook-shaped portion 42 is formed in a groove 50 so as not to project outward of the end face (for example, the end face 15a of the first member 15) of each member. The groove 50 is open to the end face (for example, the end face 15a) on the side where the hook-shaped portion 42 is disposed. This constitution is employed so as not to generate a gap between the members when coupling the respective members. A conveyance receiver 200 shown in FIG. 13 has the hook-shaped portion 42, which is formed on the end face of the third member 17 constituting the receiver main body 20, and the hook receiving portion 43, which is formed at the end face of the fourth member 18 and has a shape to engage the hook-shaped portion 42 of the third member 17, as the coupling means 230. The conveyance receiver 200 shown in FIG. 13 has the hook-shaped portion 42, which is formed on the end face of the fourth member 18 constituting the receiver main body 20, and the hook receiving portion 43, which is formed at the end face of the second member 16 and has a shape to engage the hook-shaped portion 42 of the fourth member 18, as the coupling means 230. FIG. 13 shows a cross section similar to FIG. 11.

Figure 14:
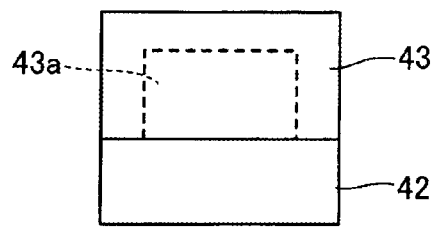
FIG. 14 is a front view schematically showing the coupling means shown in FIG. 13.

FIG. 14 shows a state where the hook-shaped portion 42 and the hook receiving portion 43 of the coupling means 230 are engaged. As shown in FIG. 13, the hook-shaped portion 42 has an L-shaped cross section. The hook receiving portion 43 has an insertion hole 43a into which a part of the hook-shaped portion 42 is inserted. FIG. 13 is an explanatory view schematically showing enlarged coupling means of the conveyance receiver for a honeycomb formed body of yet another embodiment of the present invention. FIG. 14 is a front view schematically showing the coupling means shown in FIG. 13.

Figure 15:
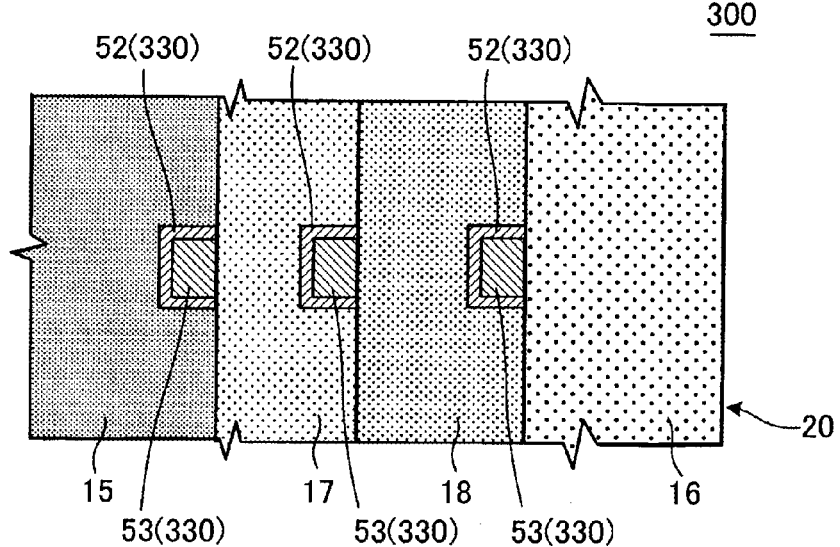
FIG. 15 is an explanatory view schematically showing enlarged coupling means of the conveyance receiver for a honeycomb formed body of yet another embodiment of the present invention.

As the coupling means, the aspect shown in FIG. 15 may be used. That is, a concaved portion and a convex portion formed at each member constituting the receiver main body may be fitted to one another to couple the respective members. A conveyance receiver 300 shown in FIG. 15 has a tubular member 52 with bottom, which is buried at one end of the first member 15 constituting the receiver main body 20, and a projecting portion 53, which projects from the end face of the third member 17 and fits with the tubular member 52 of the first member 15, as coupling means 330. The conveyance receiver 300 shown in FIG. 15 has the tubular member 52 with bottom, which is buried at one end of the third member 17 constituting the receiver main body 20, and the projecting portion 53, which projects from the end face of the fourth member 18 and fits with the tubular member 52 of the third member 17, as the coupling means 330. The conveyance receiver 300 shown in FIG. 15 has the tubular member 52 with bottom, which is buried at one end of the fourth member 18 constituting the receiver main body 20, and the projecting portion 53, which projects from the end face of the second member 16 and fits with the tubular member 52 of the fourth member 18, as the coupling means 330. The projecting portions 53 can be buried in the respective third member 17, fourth member 18, and second member 16. FIG. 15 is an explanatory view schematically showing enlarged coupling means of the conveyance receiver for a honeycomb formed body of another embodiment of the present invention. FIG. 15 shows a cross section similar to FIG. 11.

The conveyance receiver 100 has a length in a direction from the one end face 11 to the other end face 12 of approximately 145 to 295 mm.

A height of the conveyance receiver 100 is approximately 150 to 200 mm.

EXAMPLES

Hereinafter, the present invention will further specifically be described with examples, but the present invention is not limited to these examples.

Example 1

A receiver made of foamed polyurethane resin before being processed was prepared, and the receiver before being processed was cut using an end mill to fabricate respective members for constituting the receiver main body for the conveyance receiver. Conditions for the fabricated respective members are shown in Table 1.

This example fabricated the members shown in "Required Number of Pieces" in Table 1 to prepare the conveyance receivers at the receiver lengths (lengths in the direction from the one end face to the other end face) of the conveyance receiver of 165 mm, 175 mm, 195 mm, 205 mm, 245 mm, and 255 mm by 30 pieces. All the conveyance receivers had the length (receiver width) in a direction perpendicular to the receiver length of 310 mm and a height of 172 mm.

As shown in Table 1, this example fabricated the members having the respective lengths (member thicknesses) in the direction from the one end face to the other end face of 145 mm, 50 mm, 40 mm, 30 mm, and 20 mm by 30 pieces. In this case, the total number of the members was 150 pieces. The results are shown in Table 1. Members were appropriately selected from the respective members and were coupled to one another with the coupling means to form the conveyance receiver.

In the above-described case, the storage space for the respective members constituting the receiver main body was 2.7 m². The storage space was calculated in the case where three pieces of the respective members were arranged in a receiver width direction of the conveyance receiver and ten pieces of the respective members were arranged in a receiver length direction of the conveyance receiver (three pieces vertical×ten pieces horizontal). The results are shown in Table 2.

Comparative Example 1

The conveyance receivers at the respective receiver lengths of the conveyance receiver being 165 mm, 175 mm, 195 mm, 205 mm, 245 mm, and 255 mm were fabricated by 30 pieces. The conveyance receiver of Comparative Example 1 was fabricated similar to Example 1 by cutting the receiver made of the foamed polyurethane resin before being processed with the end mill. All the conveyance receivers had the length (receiver width) in the direction perpendicular to the receiver length of 310 mm and the height of 172 mm similar to Example 1.

As shown in Table 1, in this comparative example, the total number of members (that is, the total number of conveyance receivers) was 180 pieces. The results are shown in Table 1.

In the case of this comparative example, the storage space of each member (conveyance receiver) was 11.5 m². The storage space was calculated in the case where three pieces of the conveyance receivers were arranged in the receiver width direction of the conveyance receiver and ten pieces of the conveyance receivers were arranged in the receiver length direction of the conveyance receiver (three pieces vertical× ten pieces horizontal). The results are shown in Table 2.

The "Combination" column of Example 1 in Table 1 shows a combination of the members required to have the receiver length to a predetermined length. For example, "145+20" indicates that the member with the receiver length of 145 mm and the member with the receiver length of 20 mm are combined to fabricate the conveyance receiver with the receiver length of 165 mm. The "Required Number of Pieces" column of Example 1 shows the members having the respective receiver lengths and the number of the members. For example, "145×30 pieces" indicates that the members at the receiver length of 145 mm were prepared by 30 pieces.

The "Receive Length and Storage Area" column in Table 2 shows an area occupied by the members having the respective receive lengths during storage. For example, "145 mm→1.35 m²" shows that in the case where the members at the receive length of 145 mm were disposed as described above, three pieces vertical×ten pieces horizontal, the required floor area is 1.35 m².

TABLE 1

|  | Comparative Example 1 | | Example 1 | | |
| --- | --- | --- | --- | --- | --- |
| No. | Receiver Length (mm) | Required Number of Pieces (piece) | Receiver Length (mm) | Combination (mm) | Required Number of Pieces |
| 1 | 165 | 30 | 165 | 145 + 20 | 145 × 30 pieces |
| 2 | 175 | 30 | 175 | 145 + 30 | 50 × 30 pieces |
| 3 | 195 | 30 | 195 | 145 + 50 | 40 × 30 pieces |
| 4 | 205 | 30 | 205 | 145 + 20 + 40 | 30 × 30 pieces |
| 5 | 245 | 30 | 245 | 145 + 20 + 30 + 50 | 20 × 30 pieces |
| 6 | 255 | 30 | 255 | 145 + 20 + 40 + 50 | |
| Total (piece) | — | 180 | — | — | 150 |

TABLE 2

|  | Comparative Example 1 | | Example 1 |
| --- | --- | --- | --- |
| No. | Receiver Length (mm) | Storage Space (m²) | Receiver Length and Storage Area |
| 1 | 165 | 1.53 | 145 mm → 1.35 m² |
| 2 | 175 | 1.63 | 50 mm → 0.47 m² |
| 3 | 195 | 1.81 | 40 mm → 0.37 m² |
| 4 | 205 | 1.91 | 30 mm → 0.28 m² |
| 5 | 245 | 2.28 | 20 mm → 0.19 m² |
| 6 | 255 | 2.37 | |
| Total Space (m²) | — | 11.5 | 2.7 |

It is found from Table 1 and Table 2 that the conveyance receiver for a honeycomb formed body of Example 1 is applicable as a conveyance receiver for honeycomb formed bodies having various lengths and the storage space for the conveyance receiver for a honeycomb formed body may be small compared with the conveyance receiver for a honeycomb formed body of Comparative Example 1.

A conveyance receiver for a honeycomb formed body of the present invention is applicable as a conveyance receiver for a honeycomb formed body in a manufacturing process of a honeycomb structure used as a filter for purifying exhaust gas of, for example, an automobile.

DESCRIPTION OF REFERENCE NUMERALS

1: honeycomb formed body, 3: side surface, 10, 10a, 10b: concaved surface, 11, 12: end face, 15: first member, 15a: end face, 16: second member, 17: third member, 17b: end face, 18: fourth member, 20: receiver main body, 30, 130, 230, 330, 430: coupling means, 31: coupling hole portion, 35: positioning plate, 37, 39: nut member, 38: bolt member, 40: skewer-shaped member, 42: hook-shaped portion, 43: hook receiving portion, 43a: insertion hole, 50: groove, 52: tubular member, 53: projecting portion, 100, 200, 300, 400: conveyance receiver, A: region

What is claimed is:

1. A conveyance receiver for a honeycomb formed body where a pillar, clayey honeycomb formed body extruded from a die is placed with its central axis set horizontally in a longitudinal direction and moves on a conveyance path to convey the honeycomb formed body to a next process, comprising:
   a concaved surface concaved at both end faces parallel to a surface perpendicular to the central axis of the honeycomb formed body to be placed, and the concaved surface being a surface in contact with a side surface of the honeycomb formed body to be conveyed; and
   a receiver main body having end face sides and constituted of a plurality of members, and
   coupling means that couples the plurality of members constituting the receiver main body to one another,
   wherein the receiver main body at least has a first member having a length from one end face side to another end face side in the longitudinal direction at the one end face side of the receiver main body and a second member having a length from one end face side to another end face side in the longitudinal direction at the other end face side of the receiver main body as the plurality of members, and wherein the length of the first member is larger than the length of the second member.

2. The conveyance receiver for a honeycomb formed body according to claim 1, wherein the coupling means couples the plurality of members constituting the receiver main body to one another by screwing or fitting.

3. The conveyance receiver for a honeycomb formed body according to claim 2, wherein the coupling means has a coupling hole portion that is open to the end face on the second member side of the receiver main body and extends to the first member, a bolt member inserted into the coupling hole portion, and a nut member screwed with the bolt member.

4. The conveyance receiver for a honeycomb formed body according to claim 3, wherein the receiver main body is made of foamed polyurethane resin.

5. The conveyance receiver for a honeycomb formed body according to claim 4, wherein a shape of the concaved surface at the end face is an arc, and a curvature radius of the concaved surface at the end face is 80mm or more.

6. The conveyance receiver for a honeycomb formed body according to claim 3, wherein a shape of the concaved surface at the end face is an arc, and a curvature radius of the concaved surface at the end face is 80mm or more.

7. The conveyance receiver for a honeycomb formed body according to claim 2, wherein the receiver main body is made of foamed polyurethane resin.

8. The conveyance receiver for a honeycomb formed body according to claim 7, wherein a shape of the concaved surface at the end face is an arc, and a curvature radius of the concaved surface at the end face is 80mm or more.

9. The conveyance receiver for a honeycomb formed body according to claim 2, wherein a shape of the concaved surface at the end face is an arc, and a curvature radius of the concaved surface at the end face is 80mm or more.

10. The conveyance receiver for a honeycomb formed body according to claim 1, wherein the receiver main body is made of foamed polyurethane resin.

11. The conveyance receiver for a honeycomb formed body according to claim 10, wherein a shape of the concaved surface at the end face is an arc, and a curvature radius of the concaved surface at the end face is 80mm or more.

12. The conveyance receiver for a honeycomb formed body according to claim 1, wherein a shape of the concaved surface at the end face is an arc, and a curvature radius of the concaved surface at the end face is 80mm or more.

* * * * *